United States Patent [19]

Nagano et al.

[11] Patent Number: 4,826,935
[45] Date of Patent: May 2, 1989

[54] PROCESS FOR GAS PHASE POLYMERIZATION OF VINYL CHLORIDE

[75] Inventors: Mineo Nagano, Shinnanyo; Michio Saito, Yokkaichi, both of Japan

[73] Assignee: Toyo Soda Manufacturing Co., Ltd., Shinnanyo, Japan

[21] Appl. No.: 69,513

[22] Filed: Jul. 2, 1987

Related U.S. Application Data

[63] Continuation-in-part of Ser. No. 903,841, Sep. 4, 1986, abandoned, which is a continuation of Ser. No. 704,066, Feb. 21, 1985, abandoned.

[51] Int. Cl.⁴ .................................................. C08F 2/34
[52] U.S. Cl. ................................. 526/230.5; 526/62
[58] Field of Search ........................... 526/230.5, 228

[56] References Cited

U.S. PATENT DOCUMENTS

| | | | |
|---|---|---|---|
| 3,156,679 | 11/1964 | Roy, Jr. | 526/230.5 |
| 3,642,745 | 2/1972 | Golstein | 526/344.1 |
| 3,692,718 | 9/1972 | Golstein | 344.1/ |
| 3,923,765 | 12/1975 | Goetze | 526/230.5 |
| 3,984,386 | 10/1976 | Strain | 526/230.5 |
| 4,090,994 | 5/1978 | Nagano | 526/201 |
| 4,584,142 | 4/1986 | Tang | 558/264 |

Primary Examiner—Christopher Henderson
Attorney, Agent, or Firm—Cushman, Darby & Cushman

[57] ABSTRACT

A process for the gas phase polymerization of vinyl chloride, which comprises homopolymerizing monomeric vinyl chloride or copolymerizing monomeric vinyl chloride with a monomer copolymerizable therewith in the gas phase at a polymerization temperature of 55° C. to 65° C. under such conditions that the ratio Pr of the polymerization pressure to the saturated vapor pressure at the polymerization temperature is in the range of $1 > Pr > 0.5$, wherein a mixture comprising diisopropylperoxy dicarbonate and di-2-ethoxyethylperoxy dicarbonate at a weight ratio of from 3/2 to 85/15 is used as the initiator.

1 Claim, 2 Drawing Sheets

PROCESS FOR GAS PHASE POLYMERIZATION OF VINYL CHLORIDE

CROSS REFERENCES TO RELATED APPLICATIONS

This application is a C.I.P. of application Ser. No. 903,841 filed 9/4/86, which is now abandoned, which was a continuation of application Ser. No. 704,066 filed 2/21/85, which is also now abandoned.

BACKGROUND OF THE INVENTION

1. Field of the Invention

The present invention relates to a process for the gas phase polymerization of monomeric vinyl chloride (hereinafter referred to as "VCM") or a mixture comprising a major amount of VCM and a minor amount of a comonomer copolymerizable therewith, in which the reactivity is highly improved.

2. Description of the Related Art

It is known from Japanese Examined Patent Publications (Kokoku) No. 48-14666 and No. 52-44918 and U.S. Pat. No. 3,578,646 that the gas phase polymerization of VCM can be carried out in the presence of a radical initiator.

The gas phase polymerization is conducted under an operation pressure Po lower than the saturated vapor pressure Ps of VCM at the polymerization temperature. Namely, in the gas phase polymerization, the relative pressure Pr (Pr=Po/Ps) is maintained within the range of $1 > Pr > 0.5$, and thus it is thought that the reactivity of the gas phase polymerization is lower than the reactivity of the liquid phase polymerization. However, in practice, the reaction speed of the gas phase polymerization is unexpectedly high; for the following reasons:

(1) A seed polymer prepared by preliminary bulk polymerization has a high porosity and the amount of VCM absorbed by the seed polymer is unexpectedly large, although this amount depends on the polymerization temperature and the value Pr. Namely, the amount of VCM absorbed in the seed polymer is 20 to 65% by weight (on a dry basis) and this VCM participates in the above-mentioned reaction.

(2) In the batchwise liquid phase reaction, the amount of initially charged VCM is decreased with the advance of the polymerization, and in the later stage of the polymerization, the amount of VCM to be reacted is rapidly decreased. On the other hand, in the gas phase polymerization, the reaction pressure is kept constant and fresh VCM is supplied to compensate for the VCM absorbed and used for the polymerization. Namely, with the increase of the amount of a powder formed by the polymerization, the total amount of VCM present in the reaction system is increased.

(3) Since there is no continuous phase in the gas phase polymerization, a termination is difficult to occur, as compared with the liquid phase reaction. Accordingly, the apparent propagation rate is enhanced.

(4) In the liquid phase reaction, there is ordinarily adopted a method in which an initiator is first added to initiate the polymerization and the initiator is not additionally supplied midway through the reaction. Ordinarily, the liquid phase reaction is advanced along an S-shaped curve. Namely, at the start the reaction speed is low, then the reaction speed is linearly increased halfway and then further accelerated, and finally, the reaction becomes gentle and is stopped. In short, the reaction rate relative to the polymerization time can be shown by a sharp-peaked curve. Recently, however, efforts have been made to change this sharp-peaked curve to a gentle trapezoidal curve by using an initiator having a low temperature activity in combination with an ordinary initiator. On the other hand, in the gas phase polymerization, if the reaction pressure is maintained constantly by supplying VCM in an amount corresponding to the amount of VCM converted to a polymer, and if the feed rate of VCM is measured, the amount of VCM reacted at any time can be precisely known. Therefore, if the initiator is additionally supplied when the reaction rate is reduced. Accordingly, it is theoretically possible to maintain a linear reaction rate.

As can be seen from the above description, the reactivity of the gas phase polymerization is unexpectedly high even if the reaction is advanced in the gas phase.

Typical instances of initiators used for the gas phase polymerization are shown in the following Table 1. These initiators are appropriately selected according to the polymerization temperature.

TABLE 1

| | Abbreviation (trade mark) | Molecular weight | Temperature (°C.) at which half life period is 10 hours |
|---|---|---|---|
| α-cumylperoxy neodecanate | CNDP | 306.9 | 36.6 |
| 2,4,4-triethylpentyl-2-peroxyphenoxy acetate | TMP-PA | 280.4 | 38.5 |
| diethylperoxy dicarbonate | DEP | 178.1 | 39.0 |
| di-3-methoxybutylperoxy dicarbonate | MC | 294.3 | 43.0 |
| dimethoxyisopropylperoxy dicarbonate | MIP | 266.3 | 43.4 |
| di-2-ethoxyethylperoxy dicarbonate | EEP | 266.3 | 43.0 |
| di-3-methyl-3-methoxy-butylperoxy dicarbonate | MBP | 322 | 46.8 |
| bis-4-t-butylcyclohexyl-peroxy dicarbonate | Percadox 16 | 398.5 | 46.0 |
| di-2-ethylhexylperoxy dicarbonate | OPP | 346.5 | 47.0 |
| diisopropylperoxy dicarbonate | IPP | 206.2 | 47.0 |
| t-butylperoxy neodecanate | ND | 244.4 | 48.0 |
| t-butylperoxy pivalate | PV | 174.2 | 55 |
| 2,2-azobis(2,4-dimethyl-valeronitrile) | AIBN | 248.6 | |

TABLE 1-continued

| | Abbreviation (trade mark) | Molecular weight | Temperature (°C.) at which half life period is 10 hours |
|---|---|---|---|
| succinic acid peroxide | SA | | |
| octanoyl peroxide | O | | |
| decanoyl peroxide | D | | |
| lauroyl peroxide | LPO | | 62.0 |
| 3,5,5-trimethylhexanoyl peroxide | 355 | 314.5 | 59.5 |
| benzoyl peroxide | BPO | | |

Another characteristic feature of the gas phase polymerization is that the reactivity depends greatly on the value Pr.

As the value Pr is increased, the reactivity becomes extremely high, the bulk density is increased, the particle size distribution becomes sharper, and the portion of coarse particles is decreased. Moreover, an improvement is found in the initial coloration (hue) at the time of processing of the product and in the thermal stability. However, the polymerization in the interior of particles is advanced, the porosity is decreased and then fish eye characteristic (hereinafter referred to as "FE characteristic") is worsened.

As pointed out hereinbefore, the gas phase polymerization takes place within the range of $0.5 < Pr < 1$. However, in order to maintain the FE characteristic at a good level, and other properties at a practical level, it is preferred that the value Pr be in the range of $0.65 > Pr > 0.85$, especially 0.70 to 0.80. For example, the amount of polyvinyl chloride (hereinafter referred to as "PVC") formed per gram of the net amount of the organic peroxide (initiator: I) for 1 hour at a value Pr of 0.75 at a polymerization temperature providing an average degree of polymerization (hereinafter referred to as "$\bar{P}$") of about 1000 is 350 to 450 g-PVC/g-I.hour. This reactivity is higher than the reactivity at a polymerization temperature providing $\bar{P}$ of about 1000 in the suspension polymerization, which is 250 to 350 g-PVC/g-I.hour. However, in the gas phase polymerization, a relatively larger space volume is necessary in the upper portion of the reaction vessel. Therefore, the productivity per unit volume of the reaction vessel is equal or slightly lower than in the suspension polymerization.

SUMMARY OF THE INVENTION

We conducted research with a view to solving this problem of low productivity, and as a result, found that when specific initiators are used in combination, the reactivity is extremely enhanced by the synergistic effect. We have now completed the present invention based on this finding.

More specifically, it was found that when IPP and EEP are used at a weight ratio of at least 1/1 at a polymerization temperature of 55° C. to 65° C., the reactivity obtained is equal to or higher than the reactivity attained by use of IPP giving a highest reactivity.

Thus, the present invention provides a process for the gas phase polymerization of vinyl chloride, which comprises homopolymerizing monomeric vinyl chloride or copolymerizing monomeric vinyl chloride with a monomer copolymerizable therewith in the gas phase at a polymerization temperature of 55° C. to 65° C. under such conditions that the ratio Pr of the polymerization pressure to the saturated vapor pressure at the polymerization temperature is in the range of $1 > Pr > 0.5$, wherein a mixture comprising diisopropylperoxy dicarbonate and di-2-ethoxyethylperoxy discarbonate at a weight ratio of from 3/2 to 85/15 is used as the initiator.

DESCRIPTION OF THE PREFERRED EMBODIMENTS

The process of the present invention will now be described in detail.

For example, when the gas phase polymerization is carried out at a temperature of 60.5° C. and a value Pr of 0.75, initiators show the reactivities indicated in the following Table 2. (In the table, the mixing ratio is on the weight basis and the unit of the reactivity is g-PVC/g-I.hour.)

TABLE 2

| Single System | MC Composite System | EEP Composite System |
|---|---|---|
| EEP 400 | MC/ND (1/1) 300 | EEP/ND (1/1) 220 |
| MC 500 | MC/EEP (1/1) 330 | EEP/MC (1/1) 330 |
| IPP 650 | MC/AIBN (1/1) 360 | EEP/IPP (3/1) 480 |
| ND 250 | MC (initially added)/IPP (post-added) 450 | EPP/IPP (1/1) 650 |
| | MC/IPP (3/1) 580 | EPP/IPP (1/3) 810 |
| | MC/IPP (1/1) 650 | |
| | MC/IPP (1/3) 650 | |

In the initiators of the single system, the reactivity is higher in the order of ND<EEP<MC<IPP, and when MC is combined with ND, EPP, and AIBN, respectively, the reactivity is lower than in the single system. In the MC/IPP composite system, the synergistic effect is observed but the reactivity does not exceed that of IPP.

In the composite system of EEP with ND or MC, the reactivity is lower than in the single system. Only in case of the composite system of EEP/IPP (⅓), the reactivity is about 125% of the reactivity of IPP.

Surprisingly, when the change of the reactivity was examined by changing the value Pr, results shown in the following Table 3 were obtained.

TABLE 3

| Value Pr | MC alone | MC (initially added)/IPP (post-added) | IPP alone | EEP/IPP (1/3) |
|---|---|---|---|---|
| 0.70 | | | | 670 |
| 0.75 | 500 | 450 | 650 | 810 |
| 0.775 | | | | 1020 |
| 0.80 | 720 | | 820 | 1400 |
| 0.825 | | 610 | | 1800 |
| 0.850 | 1000 | | 1300 | 2600 |

TABLE 3-continued

| Value Pr | MC alone | MC (initially added)/IPP (post-added) | IPP alone | EEP/IPP (1/3) |
|---|---|---|---|---|
| 0.935 | | 1070 | | |

Figure 1:
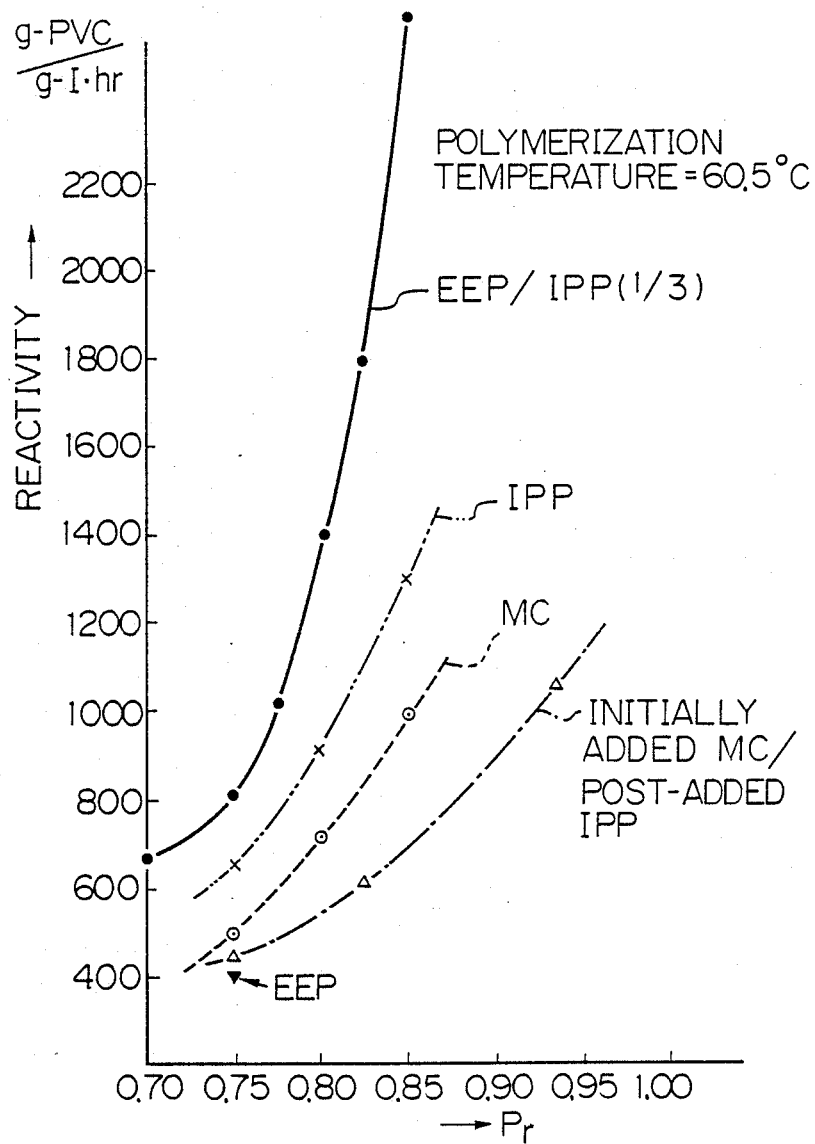
FIG. 1 is a graph showing the dependency of the reactivity on the value Pr in various initiators.

The foregoing results are plotted in FIG. 1. As is apparent from these results, the dependency of the reactivity on the value Pr differs according to the kinds and combinations of the initiators, and in the combination of EEP/IPP (⅓), the reactivity is prominently improved by the synergistic effect.

This tendency is similarly observed at temperatures of 55° C. to 65° C. in the initiators and combinations thereof as described above.

The present invention will now be described in detail with reference to the following examples that by no means limit the scope of the invention.

EXAMPLE 1 and COMPARATIVE EXAMPLES 1 through 6

(1) Preparation of Seed Polymer

A 100-liter stainless steel polymerization vessel equipped with an anchor type stirrer was coated with an antifouling agent so that the mixture was coated respectively in amount of Evans Blue 0.2 g/m², sodium lauryl sulfate 0.1 g/m² and the perfect-saponified polyvinyl alcohol 2 g/m². The polymerization vessel was then dried at 50° C. The polymerization vessel was then charged with 3.0 g of ethyl cellulose (T-50, supplied by Hercules Co., USA), 3.0 g of stearic acid, 1.0 g of a higher alcohol (Kalcol 68 supplied by Kao Soap K.K.), and 3.0 g of dioctyl tin dilaurate (JVS#8105 supplied by Nitto Kasei K.K.), followed by evacuation. Then, 56 kg of VCM was charged, the mixture was stirred at 180 rpm, and the temperature was elevated to 56° C. by circulating warm water in a jacket. Then, as the initiator, 25.0 ml of a 25% solution of isobutyl peroxide (IB) in isoparaffine and 10.0 ml of a 30% solution of 2,4,4-trimethylpentyl-2-peroxyphenoxy acetate (TMP-PA) in isoparaffin were rushed into the polymerization vessel with the aid of 4 kg of VCM to initiate the polymerization. Cooling water was controlled in the jacket so that the inner temperature was kept constant. Then, 5.0 g of ethyl cellulose T-100 dissolved in VCM was charged 1.5 hours after the initiation of the polymerization with the aid of 2 kg of VCM, mixing was conducted for 5 minutes, and constant pressure recovery was carried out at an inner temperature of 50° C. and an inner pressure of 7.2 kg/cm²G. The jacket was maintained at 54° C. for the initial 60 minutes, and then the jacket temperature was changed to 52° C. to slightly reduce the recovery speed. Then, spontaneous pressure recovery was conducted at an inner temperature of 52° C. and reduced pressure recovery was then performed by a provider (supplied by Fujikin K.K.) to remove residual VCM, and the formed polymer was withdrawn. The conversion was 17.1% and the fraction left on a 48-mesh sieve was 1.8%.

(2) Gas Phase Polymerization

A 100-liter stainless steel polymerization vessel provided with an anchor vane having a rising vane length of 350 mm and a strip vane attached to a middle plate was used, and a VCM spray nozzle of the turning type having an inlet diameter of 1.0 mm and an outlet diameter of 1.5 mm was attached to the upper portion of the polymerization vessel. The above-mentioned scale-deposition-preventing agent was coated on the polymerization vessel, followed by drying.

The polymerization vessel was charged with 3.8 kg of the seed polymer prepared in (1) above and the charge was stirred at 80 rpm, followed by evacuation. Warm water was circulated in a jacket to elevate the temperature and VCM was gradually added from the nozzle, and the temperature was further elevated. When the inner temperature was elevated to 60.5° C. and the inner pressure reached 7.5 kg/cm²G (Pr=0.75), as the initiator, 2.7 ml of 50% EEP solution in toluene/50% IPP solution in toluene (⅓) was scattered into the polymerization vessel from the nozzle by a pressure pump for feeding VCM to initiate the polymerization. The jacket temperature was kept constant at 61° C. (for preventing scale), and in order to remove the polymerization heat, the feed rate of the pressure pump for feeding VCM was controlled according to the inner pressure of the polymerization vessel. The inner temperature was controlled, and evaporated excess VCM gas was recovered, cooled, liquefied, and recycled. The amount of VCM reacted could be determined by measurements conducted at predetermined intervals in a metering vessel. If the reaction speed was reduced, the above-mentioned initiator was additionally supplied. When the breeding ratio reached 5.5, as the inhibitor, 3.5 g of 4,4-butylidene-bis(3-methyl-6-tert-butylphenol) and 1.5 g of diphenylmonodecyl phosphite dissolved in VCM were sprayed into the polymerization vessel, and residual VCM was removed by recovery under reduced pressure and the obtained product was withdrawn. The obtained results are shown in the following table.

The results obtained by using other initiators or combinations are also shown in the following Table 4.

TABLE 4

| | Example No. 1 | Comparative Example No. | | | | | |
|---|---|---|---|---|---|---|---|
| | | 1 | 2 | 3 | 4 | 5 | 6 |
| Polymerization temperature and pressure | 60.5° C., 7.0 kg/cm² G (Pr 0.75) | | | | | | |
| Initiator used | EEP/IPP (1/3) | IPP | EEP | MC | MC/IPP (1/1) | EEP/IPP (3/1) | ND |
| Breeding ratio | 5.50 | 5.50 | 5.50 | 5.55 | 5.60 | 5.65 | 5.40 |
| Polymerization time (hours) | 6.5 | 7.0 | 8.0 | 7.5 | 7.5 | 8.0 | 10.0 |
| Amount (g) of initiator | 3.21 | 3.76 | 5.34 | 4.61 | 4.02 | 4.60 | 6.69 |
| Reactivity | 820 | 650 | 400 | 500 | 580 | 480 | 250 |

EXAMPLE 2

The preparation of seed polymer and the gas phase polymerization were carried out in the same manner as described in Example 1, except that the EEP/IPP ratio was varied as shown in the following table. The obtained results are also shown in Table 5 below. In the table, the results of Example 1 are further shown as Run No. 4.

TABLE 5

| Run No. | 1 | 2 | 3 | 4 | 5 | 6 | 7 |
|---|---|---|---|---|---|---|---|
| Polymerization temperature and pressure | 60.5° C., 7.0 kg/cm² G (Pr 0.75) | | | | | | |
| EEP/IPP ratio | 100/0 | 2/3 | 1/2 | 1/3 | 1/4 | 15/85 | 0/100 |
| Breeding ratio | 5.50 | 5.53 | 5.55 | 5.50 | 5.50 | 5.50 | 5.50 |
| Polymerization time (hours) | 8.0 | 7.2 | 6.9 | 6.5 | 7.2 | 7.5 | 7.0 |
| Amount of initiator (g) | 5.34 | 3.35 | 3.30 | 3.21 | 3.25 | 3.25 | 3.76 |
| Reactivity | 400 | 710 | 760 | 820 | 730 | 700 | 650 |

Figure 2:
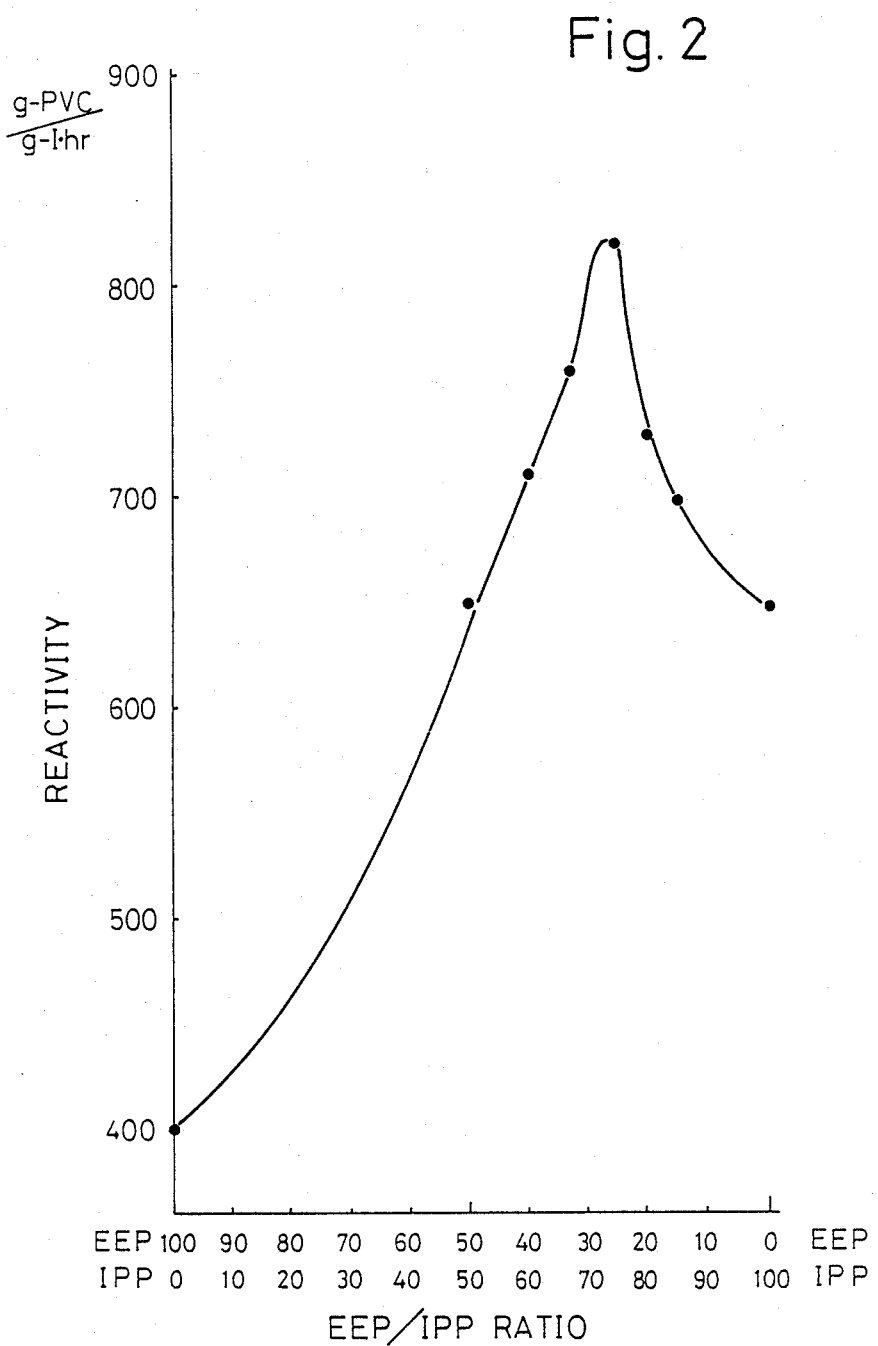
FIG. 2 is a graph showing the dependency of the reactivity on the EEP/IPP ratio.

The obtained reactivity values were plotted in FIG. 2 with respect to the EEP/IPP ratio. In the graph, the reactivity at an EEP/IPP ratio of 1/1 (50:50) as shown in Table 2.

We claim:

1. A process for the gas phase polymerization of vinyl chloride, which comprises homopolymerizing monomeric vinyl chloride or copolymerizing monomeric vinyl chloride with a monomer copolymerizable therewith in the gas phase at a polymerization temperature of 55° C. to 65° C. under such conditions that the ratio Pr of the polymerization pressure to the saturated vapor pressure at the polymerization temperature is in the range of $1 > Pr > 0.5$, wherein a mixture comprising diisopropylperoxy dicarbonate and di-2-ethoxyethylperoxy dicarbonate at a weight ratio of from 3/2 is used as the initiator.

* * * * *